United States Patent [19]
Bunn, Jr.

[11] Patent Number: 5,283,625
[45] Date of Patent: Feb. 1, 1994

[54] INTERFEROMETER PHASE MODULATION CONTROLLER APPARATUS USING RATIOS OF TWO PAIRS OF HARMONIC SIGNALS

[75] Inventor: James S. Bunn, Jr., Malibu, Calif.

[73] Assignee: Litton Systems, Inc., Beverly Hills, Calif.

[21] Appl. No.: 751,358

[22] Filed: Aug. 19, 1991

[51] Int. Cl.$^5$ .............................................. G01B 9/02
[52] U.S. Cl. .................... 356/345; 356/350; 250/227.27
[58] Field of Search .............. 356/345, 350; 250/227.19, 227.27

[56] References Cited

U.S. PATENT DOCUMENTS 4,883,358 11/1989 Okada .................. 356/350

Primary Examiner—Samuel A. Turner
Attorney, Agent, or Firm—James F. Kirk; Gerald L. Cline; M. Michael Carpenter

[57] ABSTRACT

A phase modulation control apparatus is taught in combination with an interferometer excited by a coherent light source providing a light beam to the interferometer having first and second optical paths. The interferometer senses a physical quantity such as pressure. The interferometer is coupled to provide an optical signal containing information providing a measure of the physical quantity via first and second interfering beams to a detector. The detector provides a composite output signal. The invention phase modulation control apparatus has a modulation means responsive to a modulating frequency signal and a phase modulation control signal to provide a frequency modulating factor signal for frequency modulating at least a portion of the light beam to provide a phase modulation between the first and second interfering beams at a carrier frequency. The composite output signal has at least four harmonic signals referenced to the carrier frequency. A synchronous detection means responsive to the carrier frequency signal and to the composite output signal provides a pair of even harmonic filtered signals and a pair of odd harmonic filtered signals. A reference channel means and quadrature channel means each respond to the even and odd harmonic pairs of filtered signals and respectively provide first and second integrator input error signals which have null values in response to their respective harmonic pairs having a predetermined ratio. An integration means combines and integrates the first and second integrator input error signals to provide the phase modulation control signal to the modulation means.

21 Claims, 3 Drawing Sheets

INTERFEROMETER PHASE MODULATION CONTROLLER APPARATUS USING RATIOS OF TWO PAIRS OF HARMONIC SIGNALS

BACKGROUND OF THE INVENTION

This invention pertains to a means for controlling the carrier phase modulation amplitude of a coherent optical signal output of an optical interferometer sensor system which employs a coherent optical source such as a solid state laser.

The interferometer sensor system may be fabricated using optical fibers and couplers, but the invention is not limited to such an arrangement. For example, the carrier phase modulation for a bulk optic interferometer configuration or an electrical mixing system can be controlled by the technique of this invention.

The quantity which is to be measured is called herein the "physical quantity." It includes, in part, such quantities as acceleration, pressure, magnetic field intensity, temperature and sonic waves. The apparatus may be used, for example, as a fluid pressure sensor in open water.

An example of such a sensor is described in an article, "Homodyne Demodulation Scheme for Fiber optic Sensors Using Phase Generated Carrier" by Anthony Dandridge, Alan B. Tveten, and Thomas G. Giallorenzi,which was published in the IEEE Journal of Quantum Electronics, Volume QE-18, No. 10, October 1982.

In a first topology, an optical source, such as a laser drives an interferometer. The optical source is frequency modulated to provide an input to the arms of the interferometer from a coupler. The interferometer fiber arms' lengths might be typically two or three centimeters. The actual difference in length to be used will depend on the particular design application. The actual difference in length will be functionally related to the maximum frequency excursion of the optical source as it is driven through a frequency excursion by the modulator.

As an alternative to frequency modulating the optical source, a phase modulator can be interposed in one of the arms of the interferometer and driven by the modulator source. A modulator of this type might typically comprise a PZT bobbin on which several turns of fiber from the respective arm of the interferometer is wound. The modulator voltage applied to the PZT increases and decreases the circumference of the PZT (fiber spool on the bobbin) thereby increasing and decreasing the respective optical path length of the arm.

The light exiting the two arms is combined in a second coupler, and the combined light from the second coupler is then focused on a photodetector. The combined light exiting the second coupler is the summation of the light from the first and second arms, each of which is being phase modulated, with respect to each other, as a result of the frequency modulation imposed on the optical source and the difference in lengths of the respective arms of the interferometer.

The fibers may be extended or they may be otherwise configured. For example, they could be coiled and potted. The length of each fiber can be made sensitive to changes in the measured physical quantity; or it can be made substantially insensitive to such physical quantity. The apparatus may be operated with one fiber sensitive and the other fiber insensitive to the physical quantity to be measured (such as pressure); or it may be made with both fibers sensitive to the physical quantity to be measured, with the two fibers connected in a push-pull arrangement wherein one fiber length increases while the other decreases for a given change in the physical quantity. The sensitivities of the two fibers may differ.

The measured physical quantity may be "pressure" and may be so-described herein with the understanding that any other quantity which can affect the fiber length may similarly be measured.

Although the invention is described as controlling the alternating component of current delivered to a laser diode, it is possible that a different coherent optical source could be used, and it could be frequency modulated by controlling a parameter different from the delivered current. For example, the optical source output could be passed through an integrated-optic phase modulator to provide the optical frequency modulation. (The optical frequency change is the time derivative of the optical phase change).

It is intended that this invention include control of other parameters by calling the modulation current more generally the "modulation factor" and by calling the laser diode a "coherent optical source".

The quiescent phase difference of the interferometer can drift many (even tens of thousands) of wavelengths due to pressure and temperature changes. The phase differences in the detected signal caused by slowly changing acoustic pressure or temperature can usually be separated from phase differences in the detected signal resulting from the sensed physical quantity because the phase difference in the detected signal resulting from the sensed physical quantity occur at a sufficiently higher frequency than the frequency of the phase difference in the detected signal resulting from drifting pressure and temperature variations.

Changes in fiber length difference between the arms of the interferometer change the phase, $\phi$, between the interfering beams, producing signal amplitudes that are unipolar sinusoidal functions of the phase difference.

A change in fiber length produces a much smaller change in instantaneous phase amplitude when operating at an average phase corresponding to the peak or trough of a sine wave than it produces when operating at the maximum sine wave slope. To make the apparatus more stable, i.e. less sensitive to quiescent phase shift or change between the two light beams, the optical source is frequency modulated at a frequency that is more than twice the highest phase modulation frequency component produced by the expected sensed physical parameter. In a preferred example, the modulation frequency is on the order of 10 to 100 khz. When a frequency modulated optical signal is input to an unbalanced path length interferometer, the phase difference between the interfering beams is phase modulated. The phase modulated signal may be considered a carrier for the signal produced by changes in the measured physical quantity, and the signal phase difference is superimposed upon the oscillating phase modulated signal.

The phase modulation amplitude between the optical signal exiting one arm with respect to the optical signal exiting the second arm is contained in and characterized by the amplitudes of the harmonics in the detected output signal and the ratios of the amplitudes of the harmonics in the detected output signals.

The relative amplitudes of the harmonics or the ratios of the amplitudes of the harmonics in the detected output signal inherently correspond with Bessel's Functions of the first kind having an argument (X) equal to the peak carrier phase modulation (measured in radians) between the interfering light beams at the detector. The odd and even frequency harmonics in the interferometer photodetected signal are in quadrature. The odds (1,3, . . . ) are in quadrature with the evens (0,2, . . . )at all times. By way of clarification, the first odd harmonic corresponds in amplitude to the $J_1(X)$ coefficient. The amplitude of the second odd harmonic corresponds to the $J_3(X)$ coefficient. Excluding the dc or $J_0(X)$ for this application, the first even harmonic amplitude corresponds to the $J_2(X)$ term. The Bessel Coefficients corresponding to the required values are available in published tables.

The output optical signal of a laser diode may be frequency modulated by changing the current delivered to the diode. The current delivered to the laser diode has both a d.c. component and an a.c. component. The a.c. component produces the phase modulation in the interferometer output, and it is the amplitude of the current delivered to the laser diode that is controlled by the apparatus of this invention.

The amplitude of the phase modulation of the interfering optical beams is controlled to control the sensitivity or scale factor of the demodulated output relative to a change in the phase angle between the interfering beams. As the amplitude of the ac component of the current modulating the laser frequency varies, the optical frequency of the laser output varies. As stated above, the detected interferometer output signal has a frequency spectrum wherein the coefficients of the various frequency terms are Bessel's Functions of the first kind.

The a.c. current for the laser diode is its modulation factor, and the invention will be described as controlling that current. The amplitude of that current or factor is substantially sinusoidal. Bessel's functions of the first kind of an argument, "x" appear in the coefficient expressions for the sine and cosine terms of the interferometer output phase angle, $\phi$. The argument, "x" corresponds to the interferometer peak phase modulation in radians. The interferometer output signal can be sensed and its spectrum analyzed. When analyzed, it is found that as the length difference of the two fibers changes, the frequencies corresponding to the even and odd carrier multiples fade in quadrature so that when the amplitudes of the even carrier multiples fade out, the odd carrier multiples peak, and vice versa.

The amplitudes of the various Bessel's functions are known for the different values of the argument, X. Therefore, the ratios of the variously numbered Bessel's functions to each other are also known for each value of their argument, x. According to this invention, the ratios of the coefficient amplitudes of the various frequency terms sensed by the sensor are controlled to conform to the known ratios of the Bessel's Functions. For convenience, values of x wherein $J_1(x)$ should equal $J_2(x)$, (x=2.63), and wherein $J_2(x)$ should equal $J_3(x)$, (x=3.77), are chosen for controlled amplitudes of the value of x. The modulation factor is driven at an amplitude to produce the desired Bessel function amplitude ratios of the coefficients of the carrier harmonics for the chosen value or x. Previously, an operator monitored the detected interferometer output carrier signal levels (corresponding to the selected Bessel orders) on a spectrum analyzer while the interferometer phase slowly drifted. The operator adjusted the amplitude of the current to the laser optical source to cause the coefficient of the peaked value of the carrier frequency component, fo, in the interferometer output signal to equal the peaked value of the coefficient of the 2fo frequency component when the desired operating peak phase modulation (x) was 2.63 radians. If the selected operating peak phase modulation was 3.77 radians, the operator adjusted the laser a.c. driving current to equalize the peak output signal amplitudes of the quadrature components at the frequencies 2fo and 3fo.

BRIEF DESCRIPTION OF THE INVENTION

The apparatus of this invention servos or controls the the various frequency terms of the signal from the optical sensor so that the ratios of their amplitudes correspond to the known ratios of the various Bessel's functions of the first kind.

The apparatus of this invention receives the interferometer output signal at the photodetector and synchronously demodulates the signal, extracting the information from the four frequency bands at 2,3,4 and 5 times the frequency of the modulation factor or a.c. component of current. Other carrier multiples may be used as long as two odd and two even carrier multiples are detected. The carrier multiples employed should have corresponding non-zero Bessel coefficients.

Because of some ambiguity or disagreement about the numbering of harmonics, the fundamental frequency and the first harmonic frequency are defined herein to be the same frequency. The frequency that is twice the first harmonic frequency is defined to be the second harmonic of the fundamental frequency. The higher numbered harmonics, 3, 4, . . . (k) . . . , where "k" may be any positive integer, are defined as the 3rd, 4th, . . . (k)th . . . harmonic frequencies, respectively. The word, "harmonic" is used herein interchangeably with "carrier multiple."

$J_1(x)=J_2(x)$ when x is about 2.63 radian. $J_2(x)=J_3(x)$ when x is about 3.77 radian. Either operating point is convenient to use. To illustrate the concept of the preferred embodiment, choose x=3.77 radian. At x=3.77 radian, $J_2(x)=1.69 J_4(x)$ and $J_3(x)=3.90 J_5(x)$. Reciprocals are $J_4(x)=0.59 J_2(x)$ and $J_5(x)=0.26 J_3(x)$.

The fourth carrier multiple demodulated signal is multiplied, through a scaling amplifier, by 1.69, and the multiplied signal is subtracted from the second carrier multiple demodulated signal to produce a first error signal. The first error signal is multiplied, through an analog multiplier, by the second carrier multiple demodulated signal to produce a second error signal.

The fifth carrier multiple demodulated signal is multiplied, through a scaling amplifier, by 3.90, and the multiplied signal is subtracted from the third carrier multiple demodulated signal to produce a third error signal. The third error signal is multiplied, through an analog multiplier, by the third carrier multiple demodulated signal to produce a fourth error signal.

The second and fourth error signals are added. A significant property of the second and fourth error signals is that-they are "weighted" according to the amplitudes of the second and third carrier multiples, respectively. That is, as the interferometer phase drifts, the dominant signals (odd or even carrier multiples) exert more influence over the composite error signal. A second significant property of the error signals is that the I sensell of error signals is the same for all values of quiescent interference phase. The error signal sum is integrated by an analog integrator to produce the control signal of this invention.

The control signal has two functions. It controls the amplitude of the modulation factor (the laser current) used to modulate the laser optical frequency. It may also be processed to provide a measure of the static value of the sensed physical quantity if the optical frequency modulation factor is known.

The control signal and a reference carrier frequency signal are connected to the inputs of a multiplier to control the amplitude of the carrier modulation frequency.

The phase modulation control signal may also be the input to the circuit which produces a signal of the value of the sensed quantity.

It is therefore a feature and object of this invention to control the amplitude of the modulation factor or a.c. component of current to a coherent optical source in a fiber optic interferometer.

It is also a feature and object of this invention to use the output signal from the control apparatus of this invention to control other apparatus.

It is likewise a feature and object of this invention to use the output signal from the control apparatus of this invention as a measure of a physical parameter.

It is a more specific object of this invention to control the ratios of the coefficients of the substantially sinusoidal output signals of a fiber optical interferometer which is driven by a frequency modulated coherent optical source.

It is yet a more specific object of this invention to control such ratios substantially to conform to the known ratios of amplitudes of Bessel's Functions of the first kind.

Other objects will become apparent from the following description, taken together with the accompanying drawings.

DETAILED DESCRIPTION OF THE PREFERRED EMBODIMENT

Figure 1:
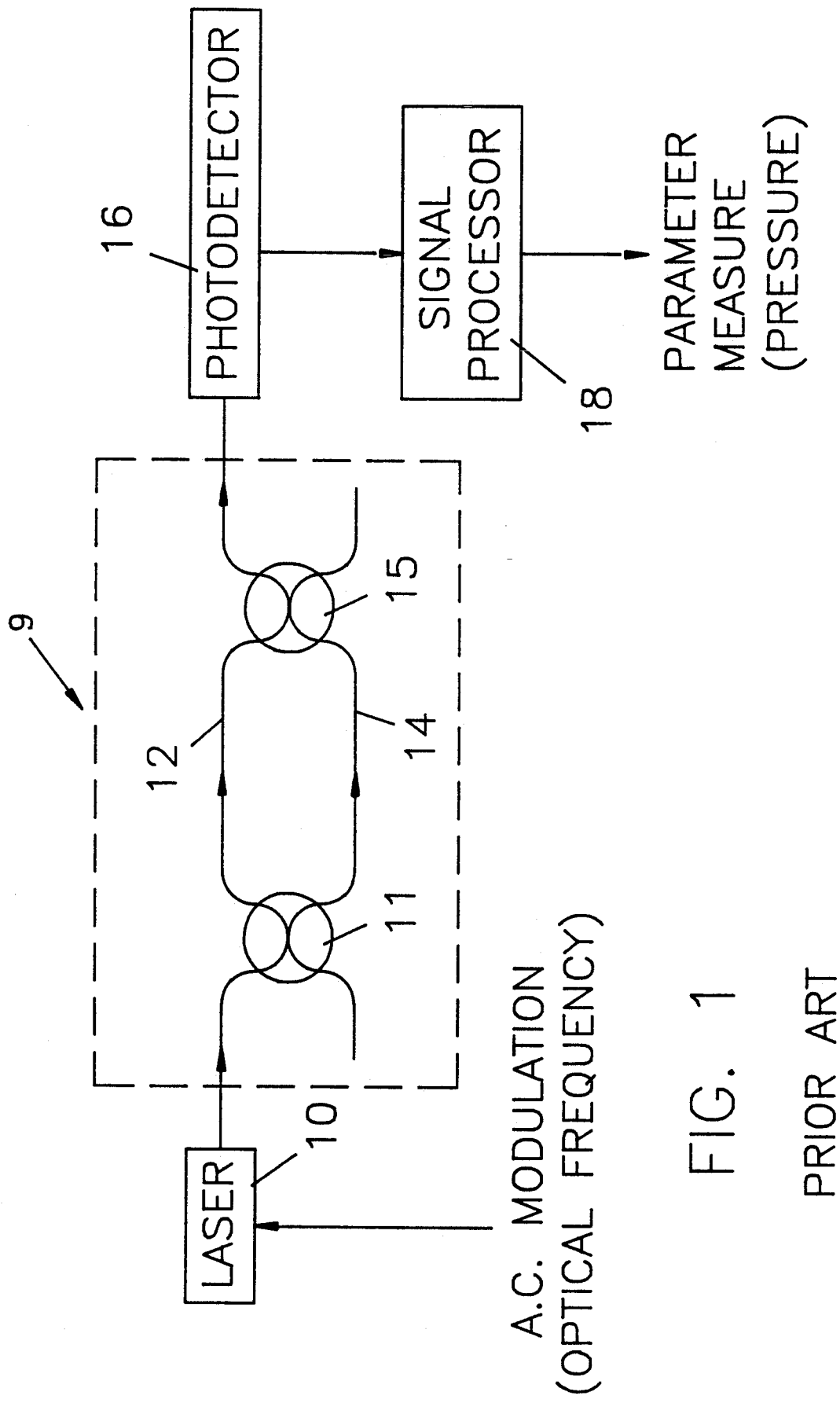
FIG. 1 is a schematic diagram of a prior art fiber optic interferometer.

FIG. 1 shows a prior art interferometer arrangement 9 for detecting a physical quantity to be measured. A coherent optical source 10, such as a laser diode delivers a coherent optical signal through an optical input coupler, 11 into two fibers which are substantially identical except that fiber 12 is slightly shorter than fiber 14. The optical signals from the fibers 12 and 14 are combined by an output optical coupler 15 and delivered to the photodetector 16. Because of the difference in length of the two fibers 12 and 14, the interference phase between the two beams from the two fibers changes as the optical frequency of the optical source 10 changes. The signal sensed by and delivered by the photodetector 16 is the phasor sum of the frequency modulation alternating component of the two received beams. The phasor sum electrical signal from the photodetector 16 is delivered to a signal processor 18 which produces an output signal that contains information that is included in a signal component that is a measure of a physical quantity to be measured. In our example, the measured physical quantity is the pressure variations experienced by fiber 14 or by both fibers 12 and 14.

Figures 2, 2A:
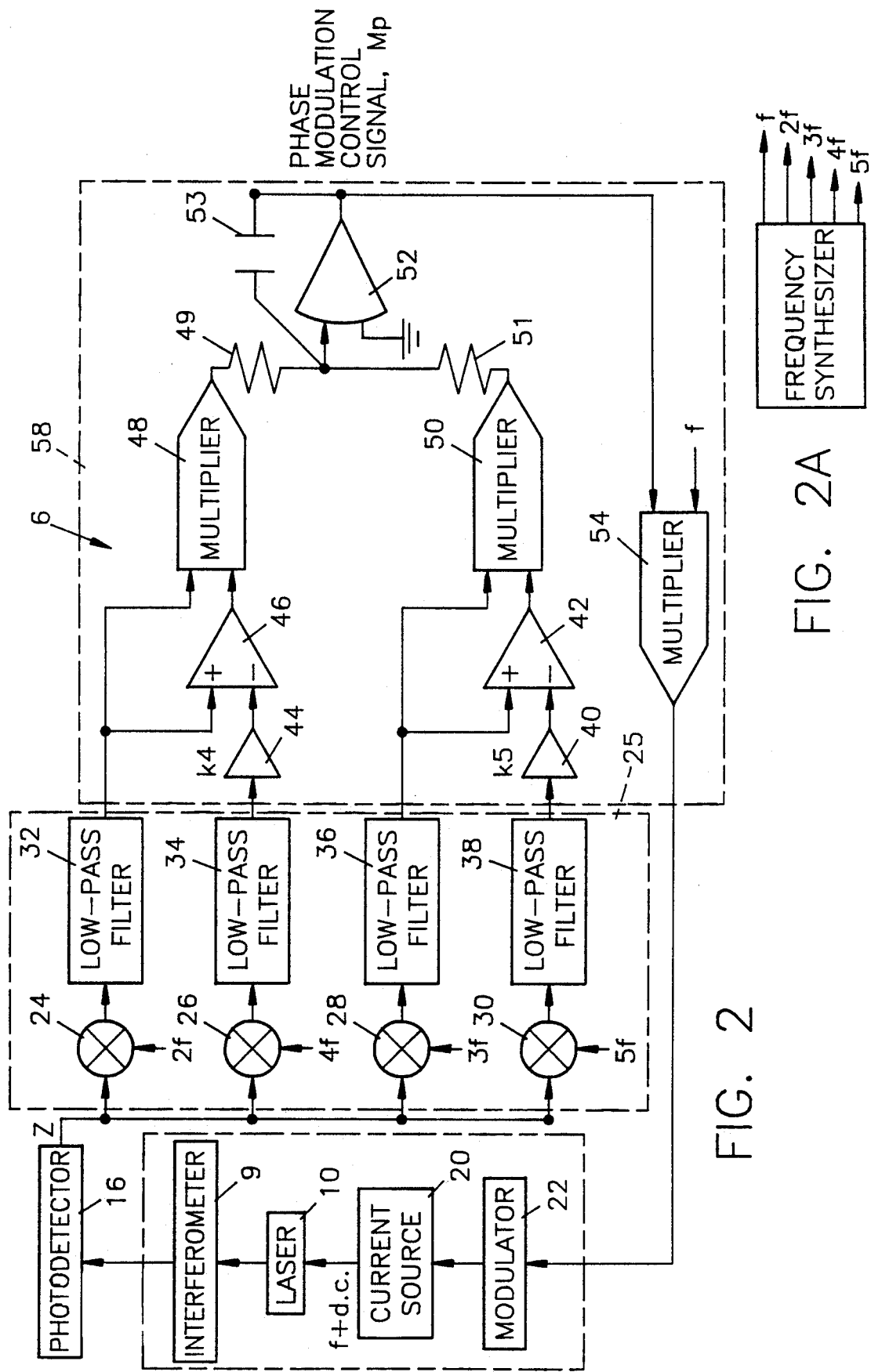
FIG. 2 is a block diagram of a preferred embodiment of the invention.
FIG. 2A shows a frequency synthesizer for use in the apparatus of FIG. 2.
Figure 3:
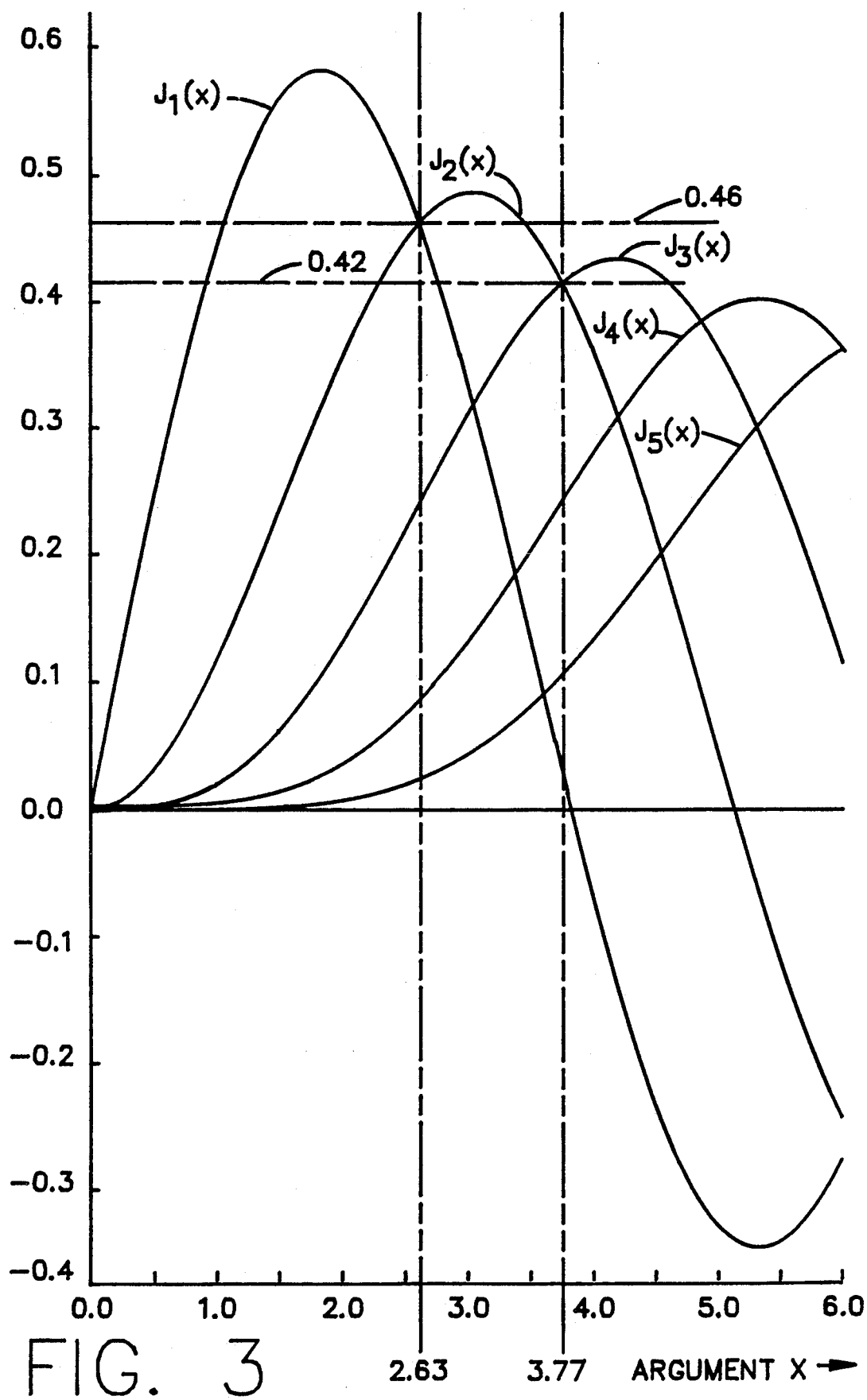
FIG. 3 is a graph of Bessel's Functions of the first kind.

FIG. 2 shows the invention Interferometer Phase Modulation Controller Apparatus 6. The current from the current source 20, shown in FIG. 2, has a d.c. component which energizes the laser diode 10. Superimposed upon the d.c. component is an a.c. component, controlled by the modulation controller shown in FIG. 2, which modulates the optical frequency of the signal delivered by the laser diode 10. The amplitude of the a.c. component is preferably controlled by the apparatus of the invention.

As the frequency of the delivered optical signal to the fibers 12 and 14 varies, the total numbers of wavelengths along the fiber lengths vary, and the phase difference between the optical signal delivered from the fibers 12 and 14 to the photodetector 16 varies with the change of frequency of laser 10.

The frequency of the modulating frequency is f, and the phase difference quadrature components, sine $\phi$ and cosine $\phi$, have coefficients that are an infinite series of the peak phase difference, "x," corresponding to the peak amplitude of the modulating phase swing. The detected signal z is delivered from the photodetector 16 to four synchronous demodulators, each preferably having a multiplier-mixer, 24, 26, 28, 30 and a low pass filter 32, 34, 36, 38 to recover baseband signals proportional to the 2f, 4f, 3f, 5f components of the signal z.

The value for x has been arbitrarily, but conveniently, chosen at 3.77 where the value Of $J_2(x) = J_3(x) = 1.69 J_4(x)$. The output of the 4f filter, 34 is multiplied, in the scaling amplifier 44, by 1.69 and the scaled signal is subtracted, in the difference amplifier 46, from the output of the 2f filter 32. The difference signal is multiplied by the 2f signal to ensure the correct polarity of the phase modulation control signal.

Similarly, the output of the 5f filter, 38 is multiplied, in the scaling amplifier 40, by 3.90 and the scaled signal is subtracted, in the amplifier 42, from the output signal of the 3f filter 36. The difference signal is multiplied by the 3f signal to ensure the correct polarity of the phase modulation control signal.

The weighted signals are summed and integrated through substantially identical summing resistors, and the output of the integrator 52 is the phase modulation control signal of the invention.

The integrator output should be unipolar and limited to a predetermined range of voltages. At the lower limit of the integrator output range, there should be enough laser optical frequency modulation to generate detected interferometer output signals at 2f and 3f to exceed the system noise floor and the controller electronics dc offsets. At the upper end of the integrator output range limit, the optical frequency modulation (when converted to phase modulation in the interferometer) should not produce a peak carrier phase modulation, x, as large as 6.9 radians because the even harmonic error signal polarity would reverse causing the control loop to become unstable (saturate the integrator).

The analog output of the integrator 52 controls the amplitude of the f frequency signal being delivered to the modulator 22.

In operation, if the signal ratios are of the values for the Bessel's functions when x=3.77, the outputs of amplifiers 42 and 46 are zero, and the outputs of the multipliers 48 and 50 are also zero., whereby the output of the integrator 52 does not change, and the modulator 22 continues to produce the proper amplitude signals to hold the outputs of multipliers 48 and 50 to zero.

However, changes in the sensing fibers cause a need for a correction in the amplitude of the output of modulator 22. To examine what happens during an attempted drift of the circuit, the outputs of the various blocks can be examined.

The output signal of the photodetector 16 is z. The output signals of the low pass filters 32, 34, 36, 38 are, respectively, $J_2(x) \cos \phi(t)$
$J_4(x) \cos \phi(t)$
$J_3(x) \sin \phi(t)$
$J_5(x) \sin \phi(t)$ These signals are summed to produce the integrator input signal. In the vicinity of $x=3.77$ radians, note that, for $\phi(t)$ statically near 0 or $\pi$ radians, $[J_2(x) \cos \phi \text{cts}(t)]^2$ is close to $[J_2(x)]^2$ while $[J_3(x) \sin \phi(t)]^2$ is relatively small. Conversely, when $\phi(x)$ is near $\pi/2$ or $3\pi/2$ radians, $[J_2(x) \cos\phi(t)]^2$ is relatively small compared to $[J_3(x) \sin \phi(t)]^2$. This result provides the error weighting according to signal presence and (for operation at $J_2(x)=J_3(x)$) provides smooth transition between the individual error signals because $\cos^2\phi(cx)+\sin^2\phi(x)=1$. It is also significant that the error signal fed into the integrator avoids the sign ambiguity that would result if the output signals of amplifiers 42 and 46 were summed to produce the integrator input.

The error signals (developed by multipliers 48 and 50) are summed through resistors 49 and 51 to provide the input to the integrator 52 which, in turn, produces the phase modulation control signal, $M_p$.

The output signals of the multipliers 48 and 50, respectively, are $][J_2(x)\cos\phi(t)]^2[1-\{1.69J_4(x)\}/J_2(x)]$ and
$[J_3(x)\sin\phi(t)]^2[1-\{3.90J_5x)\}/J_3(x)]$ With the two summing resistors 49, 51 of the integrator 52 equal in value, the phase modulation control signal, mp, is driven toward zero. The servo loop is closed by delivering the phase modulation control signal, Mp, to an analog multiplier 54 for controlling the amplitude of the modulator signal from modulator 22.

Thus, the phase modulation of the apparatus is controlled to produce specific ratios of the Bessel's coefficients in the phase modulated output signals of the apparatus.

It is instructive to choose another convenient value of X. For example, choose $x=2.63$.

When $x=2.63$,
$J_1(x)=J_2(x)=1.92J_3(x)=5.31J_4(x)=15.5J_5(x)$

One could direct the directed f component of z to the filter 32 by mixing with f in mixer 24. Similarly one could direct the 2f component to the filter 36. The 3f and 4f signals could then be directed to the filters 34 and 38, respectively, and the amplifiers 44 and 40 could be used to multiply the amplitude of the 3f signal by 1.92, the amplitude of the 4f signal by 5.31. The signals are then combined in the manner recited above to produce zero error when the amplitude ratios of the coefficients of the output signal terms to coincide to the known ratios of the Bessel's functions.

It is to be noted that the signals through the filters 32 and 36 could also be scaled if the value of x were chosen to a value requiring the coefficients of the various harmonics to differ by predetermined ratios, at any known value of x, to correspond to the ratios of Bessel's functions.

Thus, the apparatus of this invention stabilizes the peak carrier phase modulation in the interferometer output signal.

I claim:

1. In combination:

an interferometer, including two optical fibers, a laser delivering optical signals into said fibers, and an optical detector optical signals from said fibers;

means for modulating the frequency of said laser at a frequency, "f";

four demodulators, demodulating at the harmonic frequencies 2f, 3f, 4f, 5f, respectively, connected to receive signals from said optical detector;

four low-pass filters connected, respectively, to the output terminals of said demodulators;

a first multiplying amplifier connected to receive a signal at one of the even numbered harmonics and to multiply such signal by a first predetermined weight;

a second amplifier connected to receive a signal at one of the odd numbered harmonics and to multiply such signal by a second predetermined weight;

means for subtracting said weighted even numbered harmonic signal from the non-weighted other even numbered signal to produce a first difference signal;

means for subtracting said weighted odd numbered harmonic signal from the non-weighted other odd numbered signal to produce a second difference signal;

first multiplying means for multiplying said non-weighted even numbered signal by said first difference signal;

second multiplying means for multiplying said non-weighted odd numbered signal by said second difference signal;

an integrator having scaling input resistors connected to scale the output of said first multiplying means and to scale the output of said second multiplying means, and to integrate the sum of said scaled signals;

a third multiplier for multiplying said integrated signal by a signal at the frequency "f", connected to control the amplitude of modulation by said modulator.

2. Apparatus as recited in claim 1 in which said demodulators are multiplier-mixers.

3. Apparatus as recited in claim 2 wherein said first multiplying amplifier amplifies said 4f signal, and said second multiplying amplifier amplifies said 5f signal.

4. Apparatus as recited in claim 1 wherein said first multiplying amplifier amplifies said 4f signal, and said second multiplying amplifier amplifies said 5f signal.

5. An interferometer phase modulation controller apparatus for stabilizing the ac phase modulation between the optical signal exiting a first arm with respect to the optical signal exiting a second arm comprising:

an interferometer (9) having an optical input and providing an output signal;

a signal source means (10, 20, 22) responsive to a fundamental modulation signal for providing a modulated optical signal to the interferometer optical input;

a multiple frequency source (56) for providing said fundamental modulation signal and a plurality of harmonic output signals;

means (25) for extracting at least a first, a second, a third and a fourth detected modulation frequency harmonic signals comprising a first and a second pairs of harmonic signals from the detected output signal, each detected modulation frequency harmonic signal being functionally related to each respective detected modulation frequency harmonic signal;

control means (58) responsive to the first and second pairs of harmonic signals for supplying and adjusting the fundamental modulation signal to obtain a first and second pair of harmonic signals, each respective pair of harmonic signals having a predetermined ratio of amplitudes of harmonic signals.

6. The interferometer phase modulation controller apparatus of claim 5 wherein the multiple frequency source further comprises:

a frequency synthesizer means for providing said fundamental modulation signal and a plurality of harmonic output signals, each respective harmonic output signal having an output frequency that is an integer multiple of the fundamental modulation signal; and wherein said means for extracting at least four detected modulation frequency harmonic signals further comprises:

at least four phase sensitive detectors, each phase sensitive detector having an input coupled to the detected signal and an output, each phase sensitive detector having a reference input coupled to receive a respective harmonic output signal; and at least four corresponding filters having inputs connected to the output of a corresponding phase sensitive detector and an output for providing a harmonic signal characterizing the amplitude of each respective detected modulation frequency harmonic signal.

7. The interferometer phase modulation controller apparatus of claim 5, wherein:

the control means (58) responsive to the first and second pairs of harmonic signals for supplying and adjusting the fundamental modulation signal to obtain a first and second pair of harmonic signals, each respective pair of harmonic signals having a predetermined ratio of harmonic signal further comprises:

means for scaling at least one of the harmonic signals in each pair of harmonic signals by a Bessel Function related constant to provide a first and second pair of scaled harmonic signals, the first pair of scaled harmonic signals being functionally related to the cosine of a quiescent interference phase angle and the second pair of scaled harmonic signals being functionally related to the sine of the quiescent interference phase angle;

error signal means responsive to said first and second pair of scaled harmonic signals for providing a first and second error signal, each first and second error signal approaching a null value in response to the harmonic signals being in said predetermined ratios, the first error signal being functionally related to the square of the cosine of the quiescent interference phase angle and the second error signal being functionally related to the square of the sine of the quiescent interference phase angle;

integration means for summing and integrating the first and second error signals to provide a modulation control signal;

multiplier means responsive to the modulation control and the fundamental modulation signal for providing the modulation signal.

8. An interferometer phase modulation control apparatus, responsive to a carrier frequency signal from a carrier frequency signal source, in combination with an interferometer excited by a coherent light source providing a light beam to the interferometer having first and second optical paths, the interferometer dividing the light beam into a first and a second interfering beams, the interferometer being characterized to sense a physical quantity and to combine said first and second interfering beams onto a detector, said detector providing a composite output signal containing information characterizing said physical quantity, the phase modulation control apparatus comprising:

a modulation means responsive to the carrier frequency signal and a phase modulation control signal for providing a frequency modulating factor signal to the coherent light source, the modulating means frequency modulating at least a portion of the light beam in response to the carrier frequency signal to provide a phase modulation between the first and second interfering beams at a carrier frequency, the composite output signal from the detector having at least four harmonic signals referenced to the carrier frequency signal;

a synchronous detection means responsive to the carrier frequency signal and to the composite output signal for providing at least a pair of even harmonic filtered signals, each even harmonic filtered signal having a respective amplitude, and a pair of odd harmonic filtered signals, each odd harmonic filtered signal having a respective amplitude;

a reference channel means responsive to the pair of even harmonic filtered signals for providing a first integrator input error signal, the first integrator input error signal having a substantially null value in response to a ratio of the respective amplitudes of the even harmonic signals having a predetermined value;

a quadrature channel means responsive to the pair of odd harmonic filtered signals for providing a second integrator input error signal, the second integrator input error signal having a substantially null value in response to a ratio of the respective amplitudes of the odd harmonic signals having a predetermined value;

an integration means for combining and integrating the first and second integrator input error signals to provide the phase modulation control signal to the modulating means.

9. The apparatus as recited in claim 8 wherein said optical source is a solid state laser driven by a current, the frequency modulation factor signal by controlling the amplitude of the current driving the solid state laser.

10. The apparatus as recited in claim 9 wherein said current for frequency modulating the signal from the optical source is substantially sinusoidal.

11. Apparatus as recited in claim 10 wherein the respective amplitudes of each of said pair of even harmonic filtered signals have a first ratio and the respective amplitudes of the pair of odd harmonic filtered signals have a second ratio, and wherein the first ratio and the second ratio correspond to the value of the coefficient of a respective Bessel's Function of the first kind, of ascending order and to predetermined values of the interferometer peak phase modulation, the first ratio and the second ratio being compared respectively to a first ratio of even Bessel's functions and to a second ratio of odd Bessel's functions at a predetermined argument of said Bessel's functions, the amplitude of the peak phase modulation being adjusted to maintain the first ratio and the second ratio at the predetermined values.

12. Apparatus as recited in claim 11 wherein said predetermined argument of said Bessel's functions is predetermined at a value wherein the amplitudes of two of said Bessel's functions are equal.

13. Apparatus as recited in claim 12 wherein said argument is predetermined at a value wherein $J_2(x)=J_3(x)$, where "x" is said argument.

14. Apparatus as recited in claim 12 wherein said argument is predetermined at a value wherein $J1(x)=J2(x)$, where "x" is said argument.

15. Apparatus as recited in claim 8 wherein said frequency modulating factor signal is substantially sinusoidal.

16. Apparatus as recited in claim 15, wherein the respective amplitude of each of said pair of even harmonic filtered signals have a first ratio and the respective amplitude of the pair of odd harmonic filtered signals have a second ratio, and wherein the first ratio and the second ratio correspond to the value of the coefficient of a respective Bessel's Function of the first kind, of ascending order, and to predetermined values of the interferometer peak phase modulation, the first ratio and the second ratio being compared respectively to a first ratio of even Bessel's functions and to a second ratio of odd Bessel's functions at a predetermined argument of said Bessel's functions, the amplitude to the peak phase modulation being adjusted to maintain the first ratio and the second ratio at predetermined values.

17. Apparatus as recited in claim 16 wherein said predetermined arguments of said Bessel's functions is predetermined at a value wherein the amplitudes of two of said Bessel's functions are equal.

18. Apparatus as recited in claim 17 wherein said arguments are predetermined at a value wherein $J_2(x)=J_3(x)$, where "x" is said argument.

19. Apparatus as recited in claim 8 wherein said arguments are predetermined at a value wherein $HJ_1(x)=J_2(x)$, where "x" is said argument.

20. Apparatus as recited in claim 16 wherein said carrier frequency signal from a carrier frequency signal source is substantially sinusoidal.

21. Apparatus as recited in claim 16 wherein carrier frequency signal source is a multiple frequency sinusoidal source and said carrier frequency signal is provided in harmonic multiples of a fundamental modulation signal.

* * * * *